(12) United States Patent
Fukuda et al.

(10) Patent No.: US 10,570,808 B2
(45) Date of Patent: Feb. 25, 2020

(54) METHOD AND SYSTEM FOR CONTROLLING ENGINE

(71) Applicant: Mazda Motor Corporation, Aki-gun, Hiroshima (JP)

(72) Inventors: Daisuke Fukuda, Hiroshima (JP); Akira Taguchi, Hiroshima (JP); Hiroshi Minamoto, Hiroshima (JP); Naotoshi Shirahashi, Hiroshima (JP); Yudai Kato, Hiroshima (JP); Yoshie Kakuda, Hiroshima (JP); Yasuyuki Sagane, Hiroshima (JP); Sangkyu Kim, Higashihiroshima (JP); Daisuke Shimo, Hiroshima (JP); Kazunori Hirabayashi, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 23 days.

(21) Appl. No.: 15/973,060

(22) Filed: May 7, 2018

(65) Prior Publication Data
US 2018/0340488 A1 Nov. 29, 2018

(30) Foreign Application Priority Data
May 23, 2017 (JP) ................................. 2017-101522

(51) Int. Cl.
*F02B 23/06* (2006.01)
*F02D 41/40* (2006.01)
(Continued)

(52) U.S. Cl.
CPC ...... *F02B 23/0672* (2013.01); *F02B 23/0645* (2013.01); *F02B 23/0651* (2013.01);
(Continued)

(58) Field of Classification Search
CPC .............. F02B 23/0645; F02B 23/0648; F02B 23/0651; F02B 23/0654; F02B 23/0657;
(Continued)

(56) References Cited

U.S. PATENT DOCUMENTS 4,207,843 A * 6/1980 List ..................... F02B 23/0636
123/261
4,221,190 A * 9/1980 Komiyama ......... F02B 23/0651
123/263
(Continued)

FOREIGN PATENT DOCUMENTS

JP 2010121483 A 6/2010
JP 201231844 A 2/2012
(Continued)

*Primary Examiner* — Kevin R Steckbauer
(74) *Attorney, Agent, or Firm* — Alleman Hall Creasman & Tuttle LLP

(57) ABSTRACT

A control system of an engine is provided, which includes a piston formed with a cavity and configured to reciprocate in a cylinder along a center axis of the cylinder, and a fuel injector disposed facing a top surface of the piston and configured to inject fuel along an injection axis. When the piston is located near a top dead center of compression stroke, the fuel injector performs a first injection so that the fuel flows from the fuel injector toward the cavity along the injection axis, collides with an inner surface of the cavity, then flows back toward the fuel injector along the inner surface of the cavity from a position offset from the injection axis. The fuel injector performs a second injection toward the cavity at a timing after the first injection and at which the fuel of the first injection flows back.

8 Claims, 13 Drawing Sheets

(51) Int. Cl.
*F02F 3/28* (2006.01)
*F02D 41/38* (2006.01)

(52) U.S. Cl.
CPC ........ *F02B 23/0669* (2013.01); *F02D 41/401* (2013.01); *F02D 41/402* (2013.01); *F02F 3/28* (2013.01); *F02D 2041/389* (2013.01); *F02D 2200/0406* (2013.01); *F02D 2200/101* (2013.01); *F02D 2250/38* (2013.01)

(58) Field of Classification Search
CPC ............... F02B 23/066; F02B 23/0666; F02B 23/0669; F02B 23/0672
See application file for complete search history.

(56) References Cited

U.S. PATENT DOCUMENTS

| | | | | |
|---|---|---|---|---|
| 4,368,702 | A * | 1/1983 | Finsterwalder | F02B 3/06 123/1 A |
| 4,721,080 | A * | 1/1988 | Moriyasu | F02B 23/06 123/256 |
| 4,838,222 | A * | 6/1989 | Yanagisawa | F02B 23/0651 123/263 |
| 4,858,578 | A * | 8/1989 | Schereer | F02B 23/0672 123/276 |
| 5,099,809 | A * | 3/1992 | Kawatani | F02B 23/0651 123/276 |
| 6,712,036 | B1 * | 3/2004 | Andersson | F02B 23/0645 123/276 |
| 6,976,469 | B2 * | 12/2005 | Kubo | F02M 51/0603 123/295 |
| 7,096,848 | B2 * | 8/2006 | Ono | F02B 23/0693 123/193.6 |
| 7,156,069 | B2 * | 1/2007 | Ono | F02B 23/0693 123/264 |
| 7,243,862 | B2 * | 7/2007 | Dingle | F02B 19/14 239/406 |
| 7,438,039 | B2 * | 10/2008 | Poola | F02B 23/0672 123/193.6 |
| 7,827,957 | B2 * | 11/2010 | Ishikawa | F02B 23/0651 123/294 |
| 7,861,685 | B2 * | 1/2011 | Sono | F02B 1/08 123/298 |
| 7,942,126 | B2 * | 5/2011 | Zoller | F02B 23/0651 123/298 |
| 7,992,536 | B2 * | 8/2011 | Ikeya | F02B 23/0651 123/276 |
| 8,327,822 | B2 * | 12/2012 | Asai | F02B 23/0651 123/298 |
| 8,464,686 | B2 * | 6/2013 | Kim | F02B 23/0651 123/279 |
| 8,474,431 | B2 * | 7/2013 | Sono | F02B 23/0621 123/276 |
| 8,627,798 | B2 * | 1/2014 | Yamaguchi | F02B 23/0651 123/276 |
| 8,671,908 | B2 * | 3/2014 | Ives | F02B 23/0651 123/145 A |
| 8,714,136 | B2 * | 5/2014 | Ikeya | F02B 23/0651 123/193.6 |
| 9,032,930 | B2 * | 5/2015 | Kuzuyama | F02D 41/3035 123/295 |
| 9,121,336 | B2 * | 9/2015 | Lee | F02B 23/0651 |
| 9,429,065 | B2 * | 8/2016 | Zoeller | F02B 23/0651 |
| 9,476,346 | B2 * | 10/2016 | Zoeller | F02B 23/0651 |
| 9,670,826 | B2 * | 6/2017 | Gabel | F02B 23/0621 |
| 9,885,277 | B2 * | 2/2018 | Martinez | F02B 1/12 |
| 9,897,059 | B2 * | 2/2018 | Shimo | F02M 61/1806 |
| 9,938,888 | B2 * | 4/2018 | Huang | F02B 43/00 |
| 10,024,222 | B2 * | 7/2018 | Martinez | F02B 23/0669 |
| 10,030,574 | B2 * | 7/2018 | Martinez | F02B 23/0624 |
| 10,041,395 | B2 * | 8/2018 | Shimo | F02F 7/0002 |
| 10,215,082 | B2 * | 2/2019 | Richard | F02M 45/086 |
| 10,240,569 | B2 * | 3/2019 | Martinez | F02B 23/0669 |
| 10,288,026 | B2 * | 5/2019 | Martinez | F02B 23/0672 |
| 10,294,876 | B2 * | 5/2019 | Laget | F02B 23/0651 |
| 2003/0217732 | A1 * | 11/2003 | Kataoka | F02B 1/12 123/276 |
| 2005/0028784 | A1 * | 2/2005 | Kubo | F02M 51/0603 123/305 |
| 2005/0045145 | A1 * | 3/2005 | Hiraya | F02B 23/101 123/276 |
| 2005/0115538 | A1 * | 6/2005 | Ono | F02B 23/0693 123/276 |
| 2005/0224606 | A1 * | 10/2005 | Dingle | F02B 19/14 239/533.2 |
| 2006/0124103 | A1 * | 6/2006 | Ono | F02B 23/0693 123/276 |
| 2009/0070002 | A1 * | 3/2009 | Ishikawa | F02B 15/00 701/103 |
| 2009/0314253 | A1 * | 12/2009 | Sono | F02B 1/08 123/298 |
| 2010/0006061 | A1 * | 1/2010 | Shibata | F02B 23/0621 123/307 |
| 2010/0122686 | A1 * | 5/2010 | Kim | F02B 23/0651 123/298 |
| 2010/0147260 | A1 * | 6/2010 | Yamaguchi | F02B 23/0651 123/276 |
| 2010/0186709 | A1 * | 7/2010 | Ikeya | F02B 23/0651 123/307 |
| 2010/0258077 | A1 * | 10/2010 | Asai | F02B 23/0651 123/294 |
| 2010/0258078 | A1 * | 10/2010 | Ikeya | F02B 23/0651 123/305 |
| 2011/0023819 | A1 * | 2/2011 | Ives | F02B 23/0651 123/298 |
| 2012/0000197 | A1 * | 1/2012 | Maruyama | F02D 41/0057 60/605.2 |
| 2012/0260887 | A1 * | 10/2012 | Kuzuyama | F02D 41/3035 123/295 |
| 2013/0019838 | A1 * | 1/2013 | Lee | F02B 23/0651 123/298 |
| 2013/0199498 | A1 * | 8/2013 | Gabel | F02B 23/0621 123/445 |
| 2014/0048036 | A1 * | 2/2014 | Zoeller | F02B 23/0651 123/294 |
| 2014/0305402 | A1 * | 10/2014 | Zoeller | F02B 23/0651 123/294 |
| 2016/0348571 | A1 * | 12/2016 | Huang | F02B 43/00 |
| 2018/0320627 | A1 * | 11/2018 | Hoshi | F02D 41/38 |
| 2018/0334968 | A1 * | 11/2018 | Shirahashi | F02D 41/1454 |
| 2018/0334986 | A1 * | 11/2018 | Shirahashi | F02D 41/10 |
| 2018/0334987 | A1 * | 11/2018 | Shirahashi | F02D 35/023 |

FOREIGN PATENT DOCUMENTS

| JP | 2012241638 A * | 12/2012 | ........... Y02T 10/125 |
| JP | 2015232290 A | 12/2015 | |

* cited by examiner

METHOD AND SYSTEM FOR CONTROLLING ENGINE

TECHNICAL FIELD

The present disclosure relates to a method and system for controlling an engine.

BACKGROUND OF THE DISCLOSURE

JP2012-031844A discloses a diesel engine which performs a main injection and a post injection. The post injection stimulates oxidation of soot generated in a combustion chamber and reduces emission of soot.

The diesel engine described in JP2012-031844A performs the post injection at such a timing that a portion of the fuel injected by a fuel injector reaches outside of a cavity formed in a piston. That is, the post injection is performed on expansion stroke when the piston descends from a top dead center of compression stroke. Therefore, the fuel of the post injection does not contribute much to generating an engine torque. Although the post injection is effective for reducing soot emission, it is disadvantageous for fuel efficiency.

In this regard, advancing the timing of the post injection is advantageous for increasing the engine torque and improving thermal efficiency. However, this causes an interval between the main injection and the post injection to be shorter; therefore, a fuel concentration becomes locally high and a new issue of soot generation arises.

SUMMARY OF THE DISCLOSURE

The present disclosure is made in view of the above situations and aims to achieve both reduction of soot emission and improvement of fuel efficiency.

Specifically, according to one aspect of the present disclosure, a control system of an engine is provided, which includes a piston formed with a cavity and configured to reciprocate in a cylinder along a center axis of the cylinder, and a fuel injector disposed facing a top surface of the piston and configured to inject fuel along an injection axis.

When the piston is located near a top dead center of compression stroke, the fuel injector performs a first injection so that the fuel flows from the fuel injector toward the cavity along the injection axis; collides with an inner surface of the cavity; then flows back toward the fuel injector along the inner surface of the cavity, from a position offset from the injection axis. The fuel injector performs a second injection toward the cavity at a timing after the first injection and at which the fuel of the first injection flows back.

When the fuel injector performs the first injection, the fuel flowing along the injection axis, after colliding with the inner surface of the cavity, flows back from the position of the cavity offset from the injection axis toward the fuel injector. As such, the cavity changes the flow direction of the fuel.

Since the first injection is performed when the piston is located near the top dead center of compression stroke (CTDC), this corresponds to a main injection which contributes to generating a torque of the engine. The fuel of the first injection may partially start to combust at the timing of flowing back. The fuel of the first injection may include the fuel spray and the combustion gas.

The fuel injector performs the second injection at the timing after the first injection and at which the fuel of the first injection flows back. The fuel of the first injection which flowed back is offset from the injection axis. Therefore, the fuel of the first injection and the fuel of the second injection do not mix with each other. Thus, the concentration of the fuel becoming locally high is avoided and generation of soot is reduced.

On the other hand, the second injection is performed toward the cavity. An interval between the first injection performed near the CTDC and the following second injection is short. Therefore, the fuel of the second injection also contributes in generating the engine torque.

Moreover, by performing the second injection, oxidation of soot generated as the fuel of the first injection combusts is stimulated, and therefore, soot emission is reduced.

According to this configuration, both reduction of soot emission and improvement of fuel efficiency are achieved.

The inner surface of the cavity may include, in a cross section including the center axis of the cylinder, a lip portion near an opening surface of the cavity in the top surface of the piston, a raised center portion rising from a bottom section of the cavity toward the fuel injector, and a bulging portion connecting the lip portion to the raised center portion in the form of an arc opening inward toward the center axis. The fuel injected in the first injection may flow along the raised center portion from the bulging portion of the cavity to turn back toward the fuel injector from the position offset from the injection axis, the position being offset from the injection axis in a descending direction of the piston.

Since the inner surface of the cavity includes the raised center portion, the bulging portion, and the lip portion, when the fuel is injected toward the cavity, the fuel flows along the bulging portion toward the bottom section of the cavity, then flows along the raised center portion toward the opening surface of the cavity. Thus, a tumble flow is generated inside the cavity. The fuel of the first injection flows back along the inner surface of the cavity at the position toward the piston descending direction compared to the fuel of the second injection, and the concentration of the fuel becoming locally high is avoided. Further, the tumble flow stimulates mixing of air with the fuel, which also reduces the generation of soot.

Further, according to another aspect of the present disclosure, a control system of an engine is provided, which includes a piston formed with a cavity and configured to reciprocate in a cylinder along a center axis of the cylinder, and a fuel injector disposed facing a top surface of the piston and configured to inject fuel from a nozzle port.

An inner surface of the cavity includes, in a cross section including the center axis of the cylinder, a bulging portion bulging outwardly in radial directions of the cavity from an opening surface of the cavity at the top surface of the piston. A nozzle port center line that is an extension of the center of the nozzle port of the fuel injector intersects the bulging portion when the piston is located at one of a top dead center of compression stroke and a given position near the top dead center of the compression stroke. The fuel injector performs a main injection toward the bulging portion of the cavity at a first timing when the piston is located near the top dead center of the compression stroke, and performs a second injection at a second timing when the nozzle port center line intersects the bulging portion on expansion stroke after a given interval from the end of the main injection.

When the fuel injector performs the main injection toward the bulging portion of the cavity at the first timing when the piston is located near the CTDC, the fuel flowing from the fuel injector toward the cavity collides with the bulging portion of the cavity. Then the fuel flows along the bulging portion to turn back from the cavity toward the fuel injector. The fuel which flows back is offset from the nozzle port center line, specifically, offset in a descending direction of the piston. Note that a portion of the fuel may start to combust while flowing back.

The fuel injector also performs the second injection at the second timing when the nozzle port center line intersects the bulging portion on expansion stroke after the given interval from the end of the main injection. As described above, the fuel of the main injection is offset from the nozzle port center line, and thus the fuel of the main injection and the fuel of the second injection do not mix with each other. The concentration of the fuel becoming locally high is avoided and the generation of soot is reduced.

Since the second injection also reaches inside of the cavity similarly to the fuel of the main injection, the fuel of the second injection also contributes in generating the engine torque.

Moreover, by performing the second injection, the oxidation of soot generated as the fuel of the main injection combusts is stimulated, and therefore, soot emission is reduced.

According to this configuration, both the reduction of soot emission and improvement of fuel efficiency are achieved.

The control system may further include a turbocharger configured to increase intake air pressure of the engine as an engine speed increases. The fuel injector may perform the second injection at a shorter interval as the engine speed increases.

Since pressure inside the cylinder increases as the intake air pressure increases, it becomes hard for the injected fuel to travel. Especially since the second injection performed after the main injection has a smaller fuel injection amount than in the main injection, the penetration by the second injection is weak. Therefore, the fuel of the second injection is influenced significantly by the pressure inside the cylinder. When the pressure inside the cylinder is high, the piston descends while the fuel of the second injection is flowing toward the cavity, and the fuel of the second injection does not reach the cavity.

Therefore, in the engine provided with the turbocharger which increases the intake air pressure as the engine speed increases, when the engine speed increases, i.e., the pressure inside the cylinder increases, the second injection is performed at the shorter interval between the main injection and the second injection. In this manner, when the pressure inside the cylinder is high, the injection timing of the second injection becomes earlier and the second injection is performed when the piston is near the CTDC, and therefore, the fuel of the second injection successfully reaches the cavity. Thus, the fuel of the second injection contributes in generating the engine torque, and both the reduction of soot emission and the improvement of the fuel efficiency are achieved.

This configuration is especially suitable for a configuration in which the interval between the main injection and the second injection is determined using a control map based on an engine speed and an engine load.

The control system may further include a sensor configured to detect a parameter relating to the intake air pressure of the engine. The fuel injector may perform the second injection at a shorter interval as the intake air pressure increases.

Similar to the above configuration, by performing the second injection with the shorter interval as the pressure inside the cylinder increases, the fuel of the second injection successfully reaches the cavity. Therefore, the fuel of the second injection contributes to generating the engine torque, and both the reduction of soot emission and the improvement of fuel efficiency are achieved.

This configuration is especially suitable for a configuration in which the interval between the main injection and the second injection is determined not by using the control map based on the engine speed and the engine load, but by using a model based on a detection value of a parameter relating to the intake air pressure.

The fuel injector may perform the second injection at a shorter interval as a fuel injection amount of the main injection increases.

When the injection amount of the main injection is large, since the penetration becomes stronger, a required time for the fuel of the main injection to return, after the main injection starts, back toward the injector from the cavity and reach close to the injector, becomes short. When the second injection is performed after the fuel of the main injection reaches close to the injector, the fuel of the main injection and the fuel of the second injection mix with each other and the concentration of the fuel becomes locally high.

Therefore, the second injection is performed at a shorter interval as the injection amount of the main injection increases. In this manner, since the fuel of the main injection has not reached close to the injector at the timing of performing the second injection, the concentration of the fuel becoming locally high is avoided. Further, when the interval is shortened, the piston is located near the CTDC when the second injection is performed; therefore, the fuel of the second injection reaches the cavity and contributes to the generation of engine torque, which is advantageous for improving fuel efficiency while reducing the generation of soot.

When the engine is operating within a first range, the fuel injector may perform the second injection at the second timing, and when the engine is operating within a second range in which one of an engine load and an engine speed is lower than in the first range, the fuel injector may extend the interval and perform the second injection at a third timing at which at least a portion of the fuel reaches outside of the cavity.

Within the first range, the second injection is performed at the second timing after the main injection is ended and at which the nozzle port center line intersects the bulging portion. Thereby, both the reduction of soot emission and the improvement of fuel efficiency are achieved.

Within the second range in which one of the engine load and the engine speed is lower than in the first range, the fuel injection amount of the main injection is smaller than within the first range. The penetration of the fuel of the main injection becomes weak and the required time for the fuel of the main injection to reach the bulging portion of the cavity becomes long, and also the fuel easily remains near the bulging portion after colliding therewith. Thus, if the interval between the main injection and the second injection is shortened, the fuel of the second injection mixes with the fuel of the main injection near the bulging portion, and the concentration of the fuel locally increases.

Therefore, within the second range, the interval is set to be long. In this manner, the second injection is performed at the third timing when at least a portion of the fuel reaches outside of the cavity. Although this is not advantageous for improving fuel efficiency, the concentration of the fuel is avoided from becoming locally high and soot emission is reliably reduced.

Further, according to another aspect of the present disclosure, a method of controlling an engine is provided, the engine including a piston formed with a cavity and configured to reciprocate in a cylinder along a center axis of the cylinder, and a fuel injector disposed facing a top surface of the piston and configured to inject fuel from a nozzle port. An inner surface of the cavity includes, in a cross section including the center axis of the cylinder, a bulging portion bulging outwardly in radial directions of the cavity from an opening surface of the cavity at the top surface of the piston. A nozzle port center line that is an extension of the center of the nozzle port of the fuel injector intersects the bulging portion when the piston is located at one of a top dead center of compression stroke and a given position near the top dead center of the compression stroke. The method includes performing a main injection toward the bulging portion of the cavity at a first timing when the piston is located near the top dead center of the compression stroke. The method includes performing a second injection at a second timing when the nozzle port center line intersects the bulging portion on expansion stroke after a given interval from the end of the main injection.

Also according to this method, the fuel of the main injection and the fuel of the second injection do not mix with each other and reduce the generation of soot, and the fuel of the second injection for stimulating the oxidation of the soot also contributes in generating the engine torque. Therefore, both the reduction of soot emission and improvement of fuel efficiency are achieved.

DETAILED DESCRIPTION OF THE DISCLOSURE

Hereinafter, one embodiment of a control system of an engine is described in detail with reference to the accompanying drawings. The following description gives one example of the control system of the engine.

(Configuration of Diesel Engine System)

Figure 1:
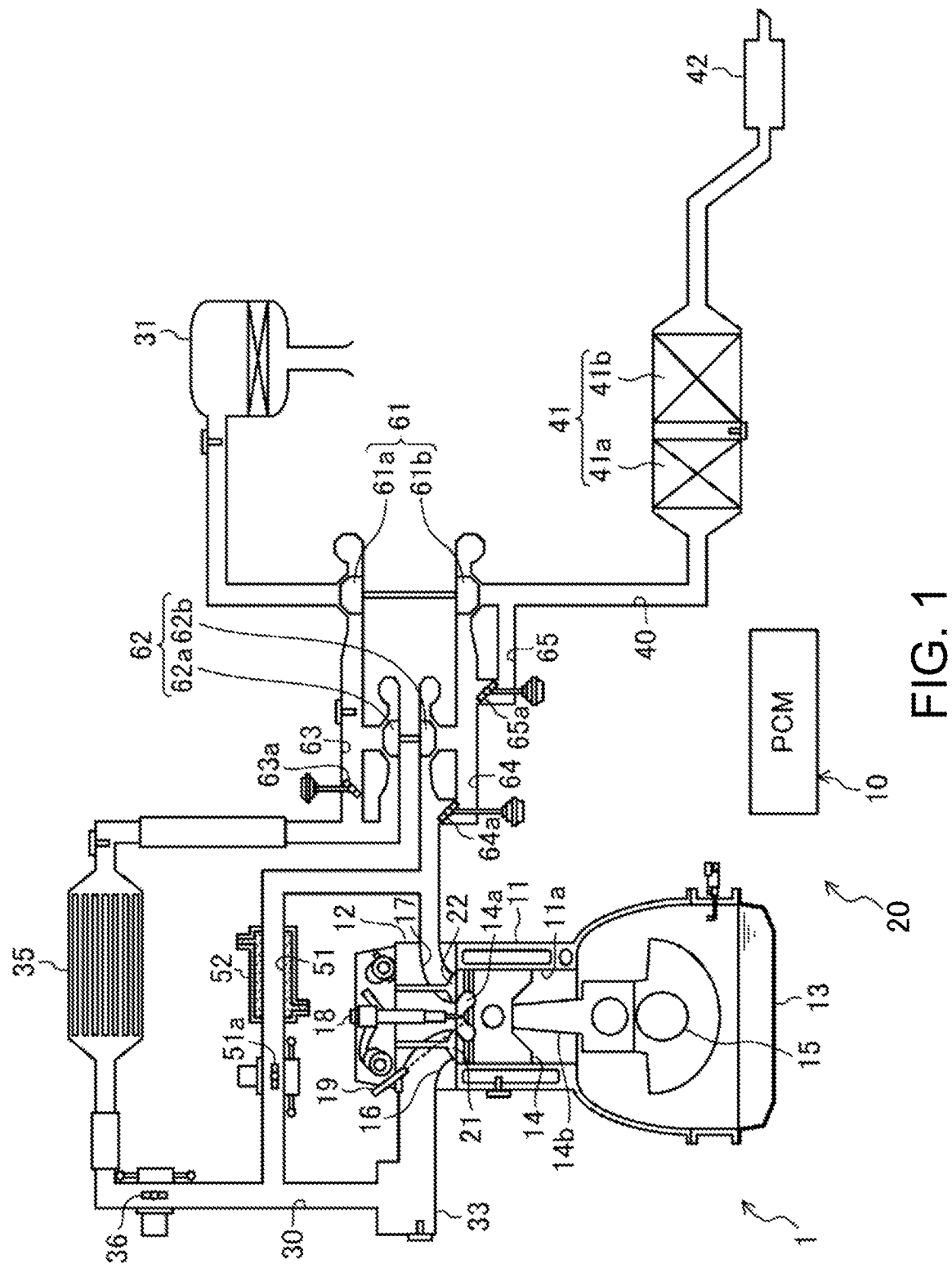
FIG. 1 is a schematic view illustrating a configuration of a diesel engine system.
Figure 2:
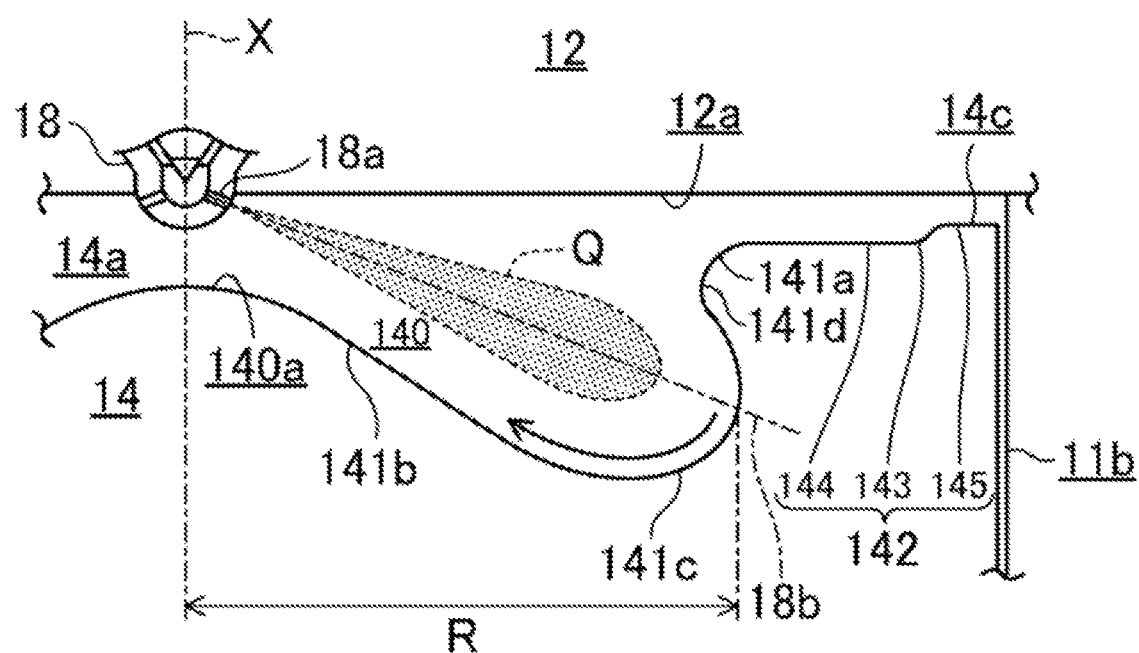
FIG. 2 is a schematic cross-sectional view illustrating a structure of a combustion chamber.
Figure 3:
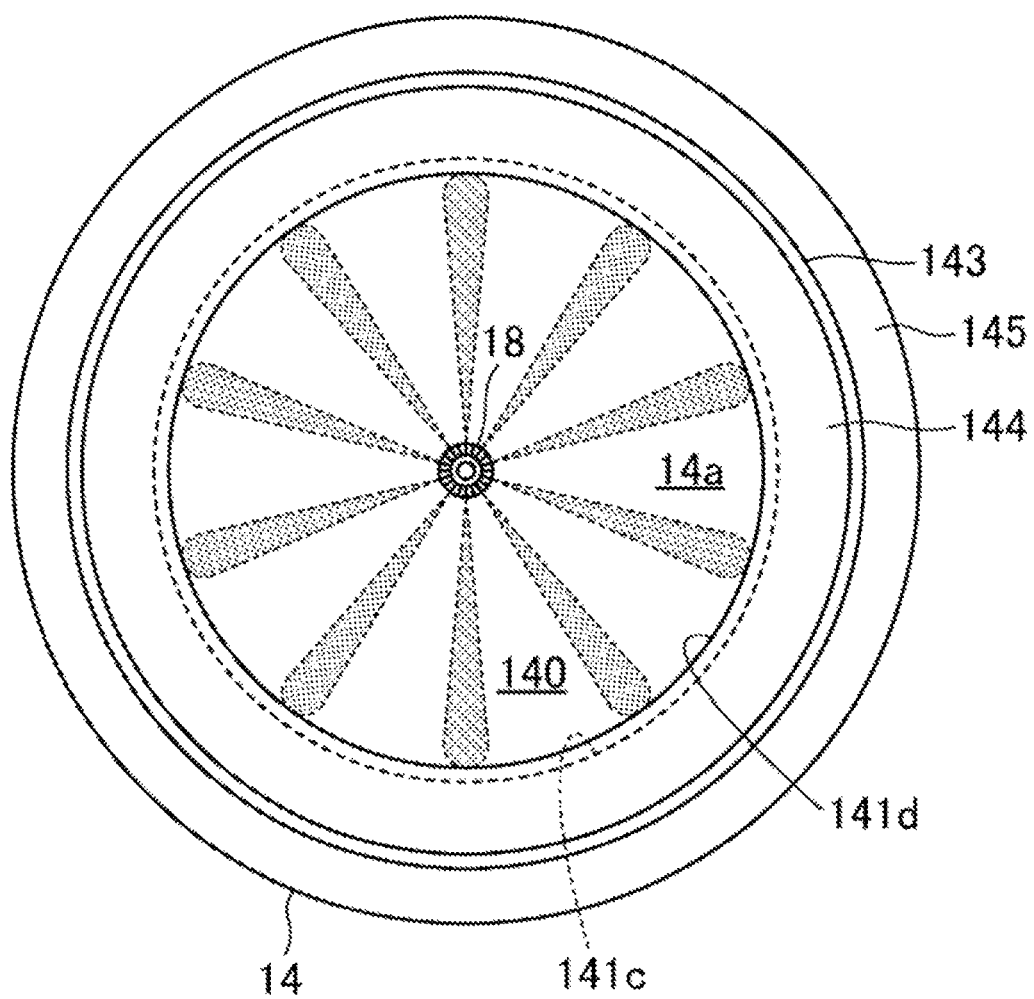
FIG. 3 is a schematic top view of the combustion chamber.

FIG. 1 illustrates a schematic configuration of the engine 1. FIGS. 2 and 3 illustrate a configuration of a combustion chamber 14a of the engine 1. The engine 1 is a diesel engine mounted on, for example, a four-wheel automobile and is supplied with fuel containing diesel fuel as a main component. The automobile travels by the engine 1 operating. The engine 1 includes a cylinder block 11 formed with a plurality of cylinders 11a (only one is illustrated in FIG. 1), a cylinder head 12 disposed on the cylinder block 11, and an oil pan 13 disposed below the cylinder block 11 that stores lubricating oil. A piston 14 is fitted into each cylinder 11a of the engine 1 to reciprocate along a cylinder center axis X. The piston 14 is coupled to a crankshaft 15 via a connecting rod 14b. A cavity 140 defining the reentrant-type combustion chamber 14a is formed in a top surface of the piston 14. Details of the shape of the cavity 140 will be described later.

The cylinder head 12 is formed with an intake port 16 and an exhaust port 17 for each cylinder 11a. An intake valve 21 which opens and closes an opening section of the combustion chamber 14a is disposed in the intake port 16. An exhaust valve 22 which opens and closes another opening section of the combustion chamber 14a is disposed in the exhaust port 17.

The engine 1 includes, as a valve operating mechanism which drives the intake valve 21 and the exhaust valve 22, a variable valve mechanism 71 (see FIG. 4) which is variable in valve timing and/or valve lift. Various known configurations may be adopted to the variable valve mechanism 71. The engine 1 changes the valve timing and/or the valve lift of the intake valve 21 and also the valve timing and/or the valve lift of the exhaust valve 22 according to an operating state of the engine 1.

The cylinder head 12 is provided with an injector 18 as a fuel injector which injects the fuel, and a glow plug 19 which warms up intake air in each cylinder 11a to increase ignitability of the fuel in a cold state of the engine 1. The injector 18 is disposed so that nozzle ports 18a through which the fuel is injected are oriented toward the combustion chamber 14a from a ceiling surface of the combustion chamber 14a (that is, a bottom surface 12a of the cylinder head 12).

An intake passage 30 is connected to one side of the engine 1. The intake passage 30 communicates with the intake ports 16 of the cylinders 11a. The intake passage 30 introduces fresh air into the combustion chambers 14a of the cylinders 11a. An exhaust passage 40 is connected to another side of the engine 1 opposite from the intake passage 30. The exhaust passage 40 communicates with the exhaust ports 17 of the cylinders 11a. The exhaust passage 40 discharges burned gas from the combustion chambers 14a of the cylinders 11a. Although it is described later, the intake passage 30 and the exhaust passage 40 are provided with a large turbocharger 61 and a small turbocharger 62 which turbocharge the intake air.

An air cleaner 31 which filters the intake air is disposed in an upstream end part of the intake passage 30. A surge tank 33 is disposed near a downstream end of the intake passage 30. A part of the intake passage 30 downstream of the surge tank 33 forms independent passages branching for the respective cylinders 11a. Downstream ends of the independent passages communicate with the intake ports 16 of the cylinders 11a, respectively.

A large compressor 61a of the large turbocharger 61, a small compressor 62a of the small turbocharger 62, an intercooler 35 which cools air compressed by the large compressor 61a and the small compressor 62a, and an intake throttle valve 36 which adjusts an intake air amount, are disposed between the air cleaner 31 and the surge tank 33 in the intake passage 30. The intake throttle valve 36 is basically fully opened, while it is fully closed when the engine 1 is stopped, so as to avoid causing a shock.

An upstream part of the exhaust passage 40 is comprised of an exhaust manifold. The exhaust manifold branches into a plurality of independent passages for the respective cylinders 11a, to connect with downstream ends of the exhaust ports 17, and has a manifold part where the plurality of independent passages are collected.

In a part of the exhaust passage 40 downstream of the exhaust manifold, a small turbine 62b of the small turbocharger 62, a large turbine 61b of the large turbocharger 61, an exhaust emission control system 41 which purifies hazardous components within exhaust gas, and a silencer 42 are arranged in order from the upstream side.

The exhaust emission control system 41 has an oxidation catalyst 41a and a Diesel Particulate Filter (hereinafter, referred to as DPF) 41b. The oxidation catalyst 41a is disposed upstream of the DPF 41b. The oxidation catalyst 41a and the DPF 41b are accommodated in a single case. The oxidation catalyst 41a has an oxidation catalyst carrying, for example, platinum or palladium with platinum, and stimulates a reaction for generating $CO_2$ and $H_2O$ by oxidizing CO and HC within the exhaust gas. Further, the DPF 41b captures particles, such as soot, contained within the exhaust gas of the engine 1. Note that the DPF 41b may be coated with an oxidation catalyst material.

An Exhaust Gas Recirculation (EGR) passage 51 intervenes between the intake passage 30 and the exhaust passage 40. The EGR passage 51 recirculates a portion of the exhaust gas to the intake passage 30. An upstream end of the EGR passage 51 is connected to a part of the exhaust passage 40 between the exhaust manifold and the small turbine 62b (i.e., a part upstream of the small turbine 62b). A downstream end of the EGR passage 51 is connected to a part of the intake passage 30 between the surge tank 33 and the intake throttle valve 36 (that is, a part downstream of the small compressor 62a). The EGR passage 51 is provided with an EGR valve 51a which adjusts a recirculation amount of the exhaust gas to the intake passage 30 and an EGR cooler 52 which cools the exhaust gas with engine cooling water.

The large turbocharger 61 includes the large compressor 61a disposed in the intake passage 30 and the large turbine 61b disposed in the exhaust passage 40. The large compressor 61a and the large turbine 61b are connected to each other and integrally rotate. The large compressor 61a is disposed between the air cleaner 31 and the intercooler 35 in the intake passage 30. The large turbine 61b is disposed between the exhaust manifold and the oxidation catalyst 41a in the exhaust passage 40.

The small turbocharger 62 includes the small compressor 62a disposed in the intake passage 30 and the small turbine 62b disposed in the exhaust passage 40. The small compressor 62a and the small turbine 62b are connected to each other and integrally rotate. The small compressor 62a is disposed downstream of the large compressor 61a in the intake passage 30. On the other hand, the small compressor 62a is disposed upstream of the large turbine 61b in the exhaust passage 40. That is, in the intake passage 30, the large compressor 61a and the small compressor 62a are arranged in series in order from the upstream side. In the exhaust passage 40, the small turbine 62b and the large turbine 61b are arranged in series in order from the upstream side.

As the large turbine 61b and the small turbine 62b rotate by an exhaust gas flow, the large compressor 61a and the small compressor 62a rotate to compress the intake air.

Here, the small turbocharger 62 is relatively small, and the large turbocharger 61 is relatively large. That is, the inertia of the large turbine 61b of the large turbocharger 61 is larger than that of the small turbine 62b of the small turbocharger 62.

An intake bypass passage 63 bypassing the small compressor 62a is connected to the intake passage 30. An intake bypass valve 63a is disposed in the intake bypass passage 63. The intake bypass valve 63a adjusts an amount of air flowing through the intake bypass passage 63. The intake bypass valve 63a is in a fully closed state (normally closed) when it is not energized.

A small exhaust bypass passage 64 bypassing the small turbine 62b and a large exhaust bypass passage 65 bypassing the large turbine 61b are connected to the exhaust passage 40. A regulating valve 64a which adjusts the amount of exhaust gas flowing through the small exhaust bypass passage 64 is disposed in the small exhaust bypass passage 64. A wastegate valve 65a which adjusts the amount of exhaust gas flowing through the large exhaust bypass passage 65 is disposed in the large exhaust bypass passage 65. The regulating valve 64a and the wastegate valve 65a are both in fully opened states (normally opened) when they are not energized.

(Structure of Combustion Chamber)

Next, the structure of the combustion chamber 14a of the engine 1 will be described in detail with reference to FIGS. 2 and 3. FIG. 2 is a cross-sectional view of the combustion chamber 14a in a state where the piston 14 is located at a top dead center (TDC). The cross section illustrated in FIG. 2 is a cross section including the cylinder center axis X. FIG. 3 is a schematic top view of the combustion chamber 14a.

As illustrated in FIG. 2, the combustion chamber 14a is defined by the bottom surface 12a of the cylinder head 12, a top surface 14c of the piston 14, and an inner surface 11b of the cylinder 11a.

A center axis of the injector 18 coincides with the center axis X of the cylinder 11a. A tip end portion of the injector 18 is arranged in the ceiling surface of the combustion chamber 14a, that is, at the center of a portion of the bottom surface 12a of the cylinder head 12 facing the top surface 14c of the piston 14. The injector 18 is of a multi-nozzle type and injects the fuel from the plurality of nozzle ports 18a formed in the tip portion, to radially spread inside the combustion chamber 14a. In this embodiment, as illustrated in FIG. 3, the injector 18 has ten nozzle ports 18a. The axis of each nozzle port 18a (nozzle port axis) extends radially outward as well as obliquely downward.

The cavity 140 is formed at the center (radial center) of the top surface 14c of the piston 14 by indenting it downwardly. The cavity 140 has an axisymmetric shape with respect to the center axis X in a cross section including the center axis X of the piston 14.

As described above, the cavity 140 is of a so-called reentrant type, rises in a raised center portion 141b, and upwardly narrows in an opening surface.

For example, an inner surface 140a of the cavity 140 has the raised center portion 141b in a bottom section of the cavity 140, rising toward the injector 18 more as it extends toward the center of the cavity 140, i.e., the center axis X side of the cylinder 11a. The inner surface 140a also has a bulging portion 141c formed radially outward from the raised center portion 141b that bulges radially outward in a cross-sectional view. The inner surface 140a also has a lip portion 141d formed between the bulging portion 141c and an opening edge 141a of the cavity 140 that is convex radially inward in a cross-sectional view. In this embodiment, each of the lip portion 141d and the bulging portion 141c curves, and the curvature continuously changes from the lip portion 141d toward the bulging portion 141c. The bulging portion 141c connects the lip portion 141d to the raised center portion 141b by forming a concave arc opening inward toward the center axis X of the cavity 140. Note that a radius R of the bulging portion 141c at an outermost diameter position is 30±2 mm.

Although the injector 18 is disposed so as to inject the fuel radially into the combustion chamber 14a as described above, particularly in this embodiment, as indicated by Q of FIG. 2, the injector 18 is disposed so as to inject the fuel toward the bulging portion 141c when the piston 14 is at or near the TDC on compression stroke (CTDC). More specifically, when the piston 14 is at the CTDC or a given position near the CTDC, the injector 18 is disposed so that each nozzle port center line 18b (nozzle port axis) formed by extending the center of the nozzle port 18a intersects the bulging portion 141c. The nozzle port center line 18b corresponds to an injection axis in which the fuel injected from the nozzle port 18a travels. The nozzle port center line 18b and the injection axis are coincident or substantially coincident with each other. Further, a distance between the outermost point of the bulging portion 141c and the center axis X of the piston 14 is set to such a length that the injected fuel does not directly (in a droplet state) come into contact with the bulging portion 141c.

Note that, as such a cavity 140, for example, the cavity disclosed in JP2010-121483A or JP2015-232290A is applicable.

The top surface 14c of the piston 14 is formed with a stepped section 143 in an outer circumferential portion 142 located radially outward of the opening edge 141a of the cavity 140. For example, a first section 144 extending radially outward from the opening edge 141a of the cavity 140, that is, an inner circumferential section of the outer circumferential portion 142 of the top surface 14c, is formed lower than a second section 145 located radially outward from the first section 144, that is, an outer circumferential section of the outer circumferential portion 142 of the top surface 14c, so as to form the stepped section 143 in the outer circumferential portion 142 of the top surface 14c.

A height length of the stepped section 143, that is, a distance between the first section 144 and the second section 145 in up-and-down directions (i.e., the cylinder center axis) is set to 0.5 mm or more. In this embodiment, the height length of the stepped section 143 is set to 1.0 mm. An upper end part of the top surface 14c, that is, the upper surface of the second section 145, is spaced downward from the bottom surface 12a of the cylinder head 12, and a given clearance is secured therebetween. This clearance at the CTDC is, for example, about 0.8 mm. Note that in FIG. 2, this clearance is drawn in a larger size for easier understanding.

When the injector 18 injects the fuel inside the combustion chamber 14a having the above structure at a timing when the piston 14 is near the CTDC, the fuel spray collides with the bulging portion 141c of the cavity 140. Then, the fuel spray flows along the bulging portion 141c in the direction indicated by the arrow in FIG. 2, and thus, a tumble flow from the outer circumferential side of the cavity 140 toward the center thereof along the inner surface 140a of the cavity 140 is generated. More specifically, a tumble flow is generated in which, due to the fuel spray colliding with the bulging portion 141c below the lip portion 141d, the fuel spray flows downwardly and then toward the center axis of the cylinder 11a along the bulging portion 141c, and then flows upwardly as well as toward the center axis of the cylinder 11a along the raised center portion 141b. Particularly, in this embodiment, since each of the lip portion 141d and the bulging portion 141c curves as well as its curvature continuously changing from the lip portion 141d toward the bulging portion 141c, the gas within the cavity 140 more reliably moves along the inner surface 140a of the cavity 140, and a stable tumble flow is generated. The generation of the tumble flow is also stimulated by a squish flow which enters from a section between the outer circumferential portion 142 of the cavity 140 and the bottom surface 12a of the cylinder head 12, toward the cavity 140.

When the fuel is injected into the cavity 140 in this manner, the tumble flow is generated inside the cavity 140, and the fuel spray moves downwardly with the tumble flow. Here, combustion of a portion of the fuel has already started and the fuel spray and the combustion gas move downwardly. Further, in this embodiment, as described above, the distance between the bulging portion 141c and the center axis X of the piston 14 is set at such a length that the injected fuel does not directly (in a droplet state) come into contact with the bulging portion 141c. Thus, adhesion of the fuel to the inner surface 140a of the cavity 140 is prevented.

The fuel spray and the combustion gas moved downwardly along the bulging portion 141c of the cavity 140 accelerate by moving along the bulging portion 141c, and move to the raised center portion 141b of the cavity 140 while blowing off the fuel adhered to the inner surface 140a of the cavity 140 and without interfering with the fuel spray before reaching the inner surface 140a of the cavity 14, and then mix with the air in a center section of the cavity 140. Then, the combustion gas diffuses uniformly within the entire combustion chamber 14a as the piston 14 descends, and the air within the entire combustion chamber 14a efficiently combusts.

As described above, in this embodiment, the fuel spray moves with the tumble flow along the inner surface 140a of the cavity 140, so that a locally rich state is avoided from occurring by stagnation of the fuel or interference, the mixing of the air and the fuel is stimulated, and uniform and lean combustion gas is generated.

(Configuration of Control System of Engine)

Figure 4:
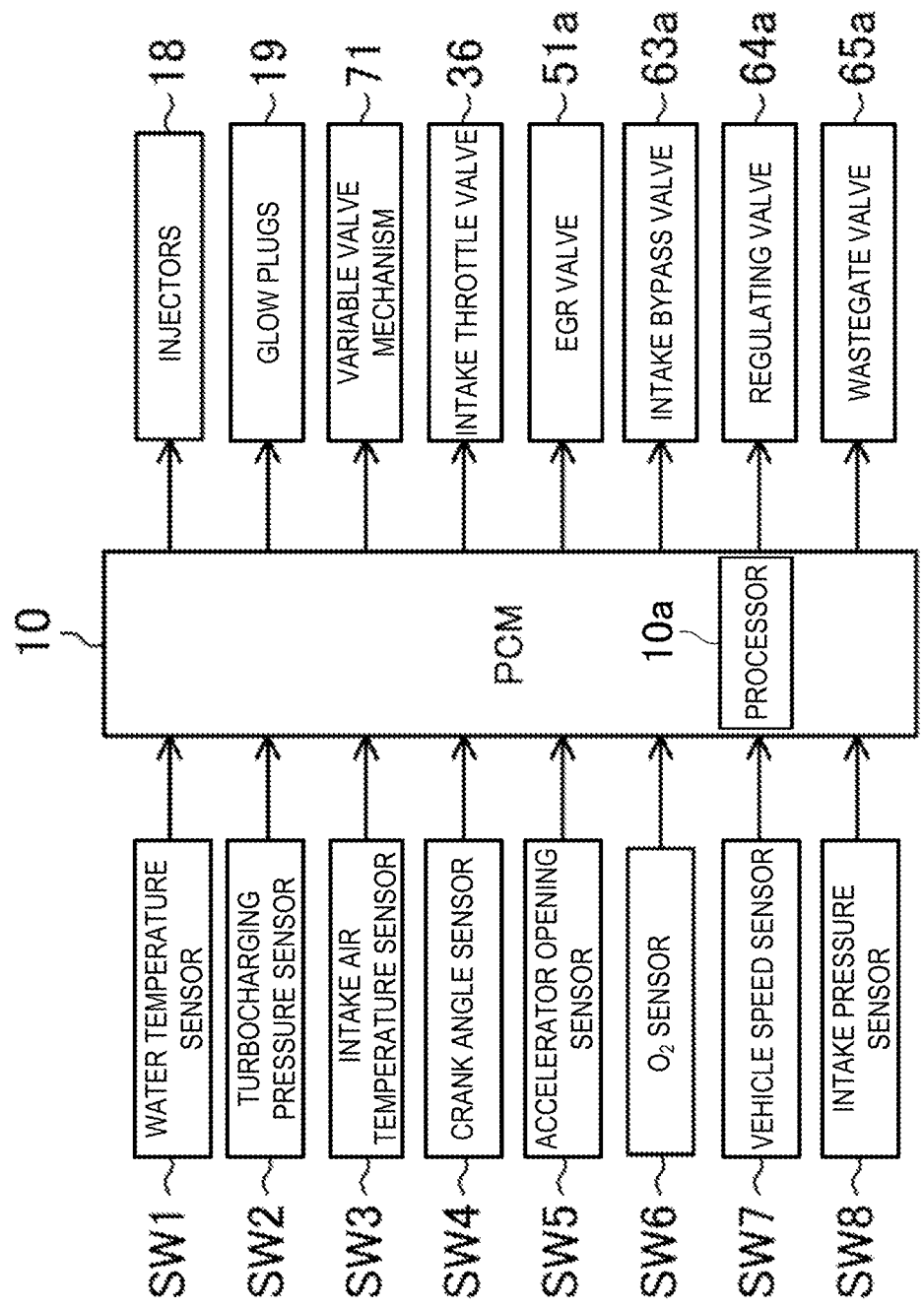
FIG. 4 is a block diagram relating to one example of a control of the diesel engine.

Returning to FIG. 1, the engine 1 is controlled by a control system 20 including a Powertrain Control Module (PCM) 10, the piston 14, and the injector 18. The PCM 10 is a microprocessor comprised of a processor 10a (i.e., a central processing unit (CPU)), a memory, a counter timer group, an interface, and a path connecting these units. This PCM 10 constitutes a control device. As illustrated in FIG. 4, the PCM 10 receives detection signals of various sensors. For example, these sensors include: a water temperature sensor SW1 which detects the temperature of the engine cooling water; a turbocharging pressure sensor SW2 attached to the surge tank 33 and which detects pressure of air supplied to the combustion chamber 14a; an intake air temperature sensor SW3 which detects the temperature of the intake air; an intake pressure sensor SW8 which detects the pressure of the intake air; a crank angle sensor SW4 which detects a rotational angle of the crankshaft 15; an accelerator position sensor SW5 which detects an accelerator opening corresponding to an operation amount of an accelerator pedal (not illustrated) of the vehicle; an 02 sensor SW6 which detects an oxygen concentration within the exhaust gas; and a vehicle speed sensor SW7 which detects a vehicle speed. The PCM 10 performs various calculations based on the detection signals of the sensors SW1 to SW8 so as to determine the states of the engine 1 and the automobile, and also outputs control signals to actuators of the injector 18, the glow plug 19, the variable valve mechanism 71, the intake throttle valve 36, the EGR valve 51a, the intake bypass valve 63a, the regulating valve 64a, and the wastegate valve 65a.

The engine 1 has a relatively low compression ratio of which a geometric compression ratio is between 12:1 and 15:1. In the engine 1, the low compression ratio is set in order to improve an exhaust emission performance and thermal efficiency.

(Fuel Injection Control of Engine)

A basic control of the engine 1 by the PCM 10 includes determining a target torque based on information on the accelerator opening, a vehicle speed and a gear position of a transmission, and causing the injector 18 to perform a fuel injection according to the target torque. The PCM 10 also controls a recirculation rate of the exhaust gas into the cylinder 11a by controlling openings of the intake throttle valve 36 and the EGR valve 51a (i.e., external EGR control) and/or controlling the variable valve mechanism 71 (i.e., the internal EGR control).

Figure 5:
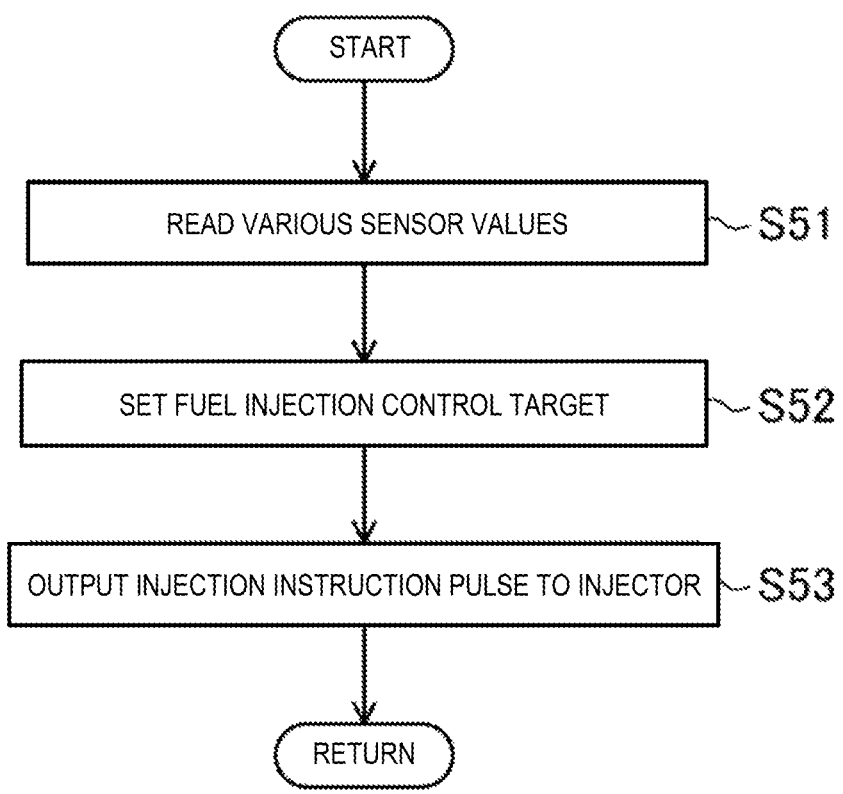
FIG. 5 is a flowchart illustrating a control procedure relating to a fuel injection performed by a PCM.

FIG. 5 illustrates a flowchart relating to a fuel injection control of the injector 18 executed by the PCM 10. At S51, the PCM 10 reads the detection signals of the various sensors SW1 to SW8, and next at S52, the PCM 10 sets a control target value of the fuel injection, specifically, a fuel injection amount and a fuel injection timing. The injector 18 may perform a plurality of fuel injections into the combustion chamber 14a in one combustion cycle. The fuel injection amount and the fuel injection timing set at S52 include the injection amount and the injection timing of each injection.

At S53, the PCM 10 outputs an injection instruction pulse to the injector 18 based on the set fuel injection amount and fuel injection timing. In response to the injection instruction pulse, the injector 18 injects the fuel into the combustion chamber 14a. The fuel ignites and combusts inside the combustion chamber 14a.

(Short Interval Injection)

As described above, the engine 1 may perform the plurality of fuel injections in one combustion cycle according to the operating state. The plurality of fuel injections may include at least a main injection (i.e., a first injection) which generates torque of the engine 1 and a second injection which comes after the main injection. The main injection is performed at a timing when the piston 14 is located near the CTDC. The fuel injected in the main injection ignites and combusts at a timing which is after and near the CTDC, and generates the torque of the engine 1. The second injection is performed on expansion stroke. The second injection stimulates oxidation of soot generated in the combustion chamber 14a and reduces soot emission. The second injection may be referred to as an "after injection."

In this embodiment, by shortening a time gap (i.e., an interval) between the main injection and the second injection, both the reduction of soot emission and improvement of fuel efficiency are achieved. Next, the fuel injection mode including the main injection and the second injection will be described with reference to the drawings.

Figure 6:
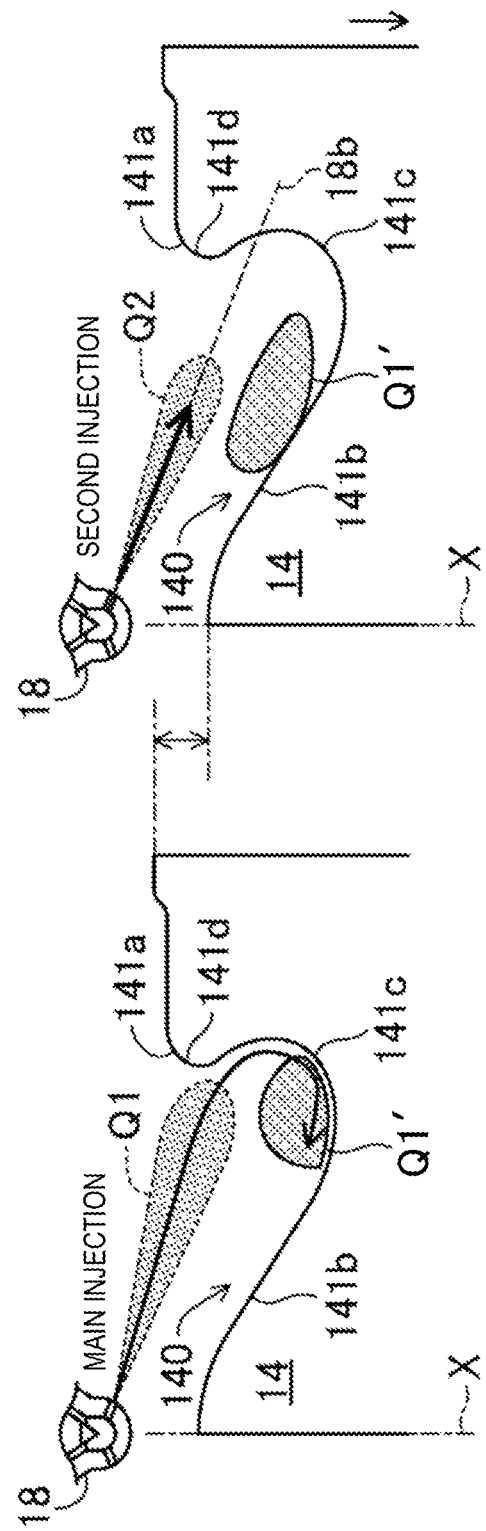
FIG. 6 is a transition view illustrating a state inside the combustion chamber in a fuel injection mode to which the present disclosure is applied.
Figure 7:
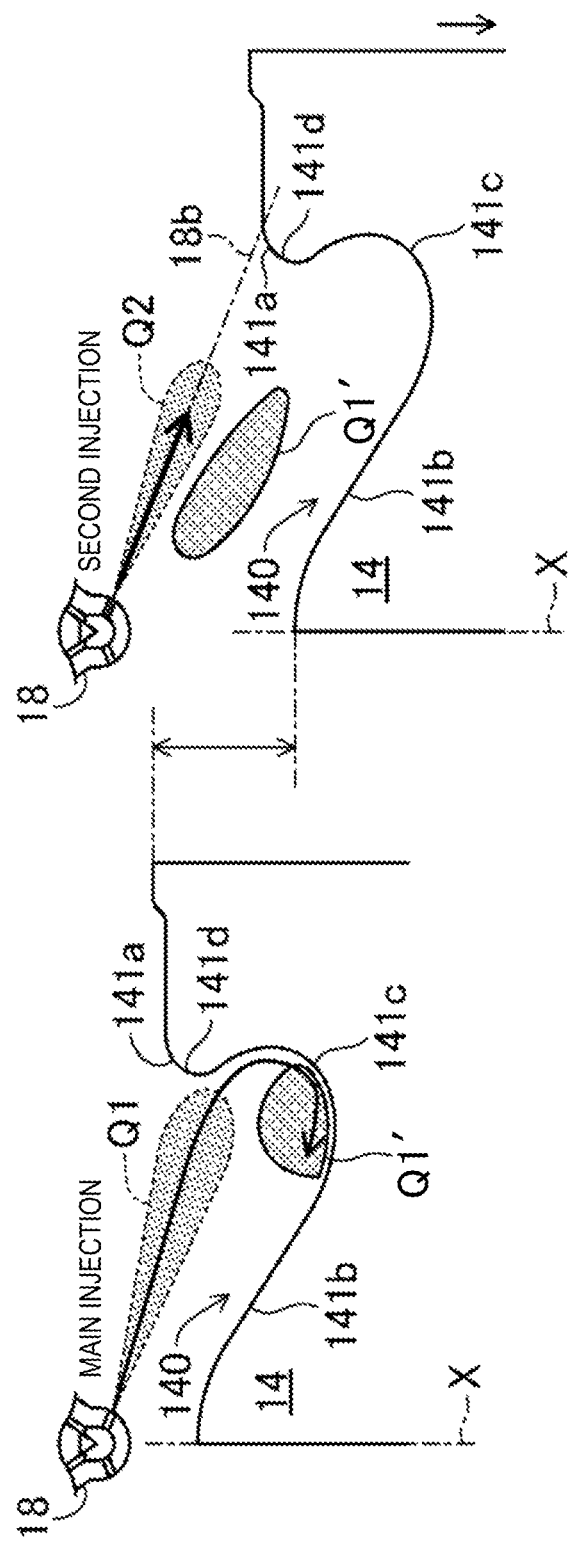
FIG. 7 is a view illustrating a state inside the combustion chamber in a comparative example of the fuel injection mode, corresponding to FIG. 6.

FIG. 6 is a transition view illustrating a state inside the combustion chamber 14a regarding a fuel injection mode of the main injection and the second injection of this embodiment. FIG. 7 is a transition view illustrating a state inside the combustion chamber 14a in a fuel injection mode as a comparative example of this embodiment.

First, the comparative example is described. The left part of FIG. 7 illustrates the inside of the combustion chamber 14a when the injector 18 performs the main injection. The main injection is performed at a given timing at which the piston 14 is located near the CTDC. The fuel of the main injection Q1 travels along the nozzle port axis. As described above, when the piston 14 is located near the CTDC, since the nozzle port center line 18b of the injector 18 intersects the bulging portion 141c, the main injection fuel Q1 collides with the bulging portion 141c. After the collision, as indicated by the arrow in the left part of FIG. 7, the main injection fuel Q1 flows along the bulging portion 141c to turn back from the cavity 140 toward the injector 18. The turned-back main injection fuel Q1' (including the fuel spray and the combustion gas as described above) is offset from the nozzle port axis to the descending side of the piston 14 (i.e., the lower side of FIG. 7).

The right part of FIG. 7 illustrates the inside of the combustion chamber 14a when the injector 18 performs the second injection. The second injection according to the comparative example is performed after a relatively long period of time since the end of the main injection. Therefore, the piston 14 is far from the CTDC to the descending side, and the nozzle port center line 18b of the injector 18 does not intersect the bulging portion 141c.

After the relatively long period of time since the end of the main injection, the main injection fuel Q1' which turned back has reached close to the injector 18. Therefore, the main injection fuel Q1' and second injection fuel Q2 easily mix with each other. When the main injection fuel Q1' and the second injection fuel Q2 mix with each other, the concentration of the fuel locally increases in the combustion chamber 14a, resulting in the generation of soot.

Further, since the piston 14 is descending, at least a portion of the second injection fuel Q2 does not enter the cavity 140. Due to the combustion timing of the second injection fuel retarding from the CTDC as the injection timing of the second injection is retarded, the contribution of the second injection fuel Q2 to the torque generation of the engine 1 becomes little.

Therefore, with the fuel injection mode according to the comparative example, the reduction in soot emission and improvement in fuel efficiency are not achieved.

In this regard, in the fuel injection mode of this embodiment, as illustrated in the left part of FIG. 6, the main injection is performed at a timing when the piston 14 is located near the CTDC. The timing of the main injection is the same as that of the comparative example illustrated in the left part of FIG. 7. The main injection fuel Q1 travels along the nozzle port axis toward the bulging portion 141c and collides with the bulging portion 141c. Then, the main injection fuel Q1' flows along the bulging portion 141c to turn back toward the injector 18 from the cavity 140.

In the fuel injection mode of this embodiment, as illustrated in the right part of FIG. 6, the second injection is performed within a relatively short time after the end of the main injection. That is, the injector 18 performs the second injection during the expansion period, with a given interval from the end of the main injection. Therefore, the second injection is performed at a timing when the piston 14 is located near the CTDC. More specifically, the injector 18 performs the second injection at a timing when the nozzle port center line 18b of the injector 18 intersects the bulging portion 141c. The injection timing of the second injection may also be said to be the timing which is after the main injection is ended and at which the main injection fuel Q1' turns back.

Although the second injection fuel Q2 travels along the nozzle port axis, the main injection fuel Q1' which turned back is offset from the nozzle port axis. Further, the main injection fuel Q1' does not reach close to the injector 18, and in the example of FIG. 6, it still remains within the cavity 140. Therefore, the main injection fuel Q1' and the second injection fuel Q2 do not mix with each other. In the fuel injection mode of this embodiment, it is avoided that the concentration of the fuel locally becomes high in the combustion chamber 14*a*. Thus, the generation of soot is reduced.

Since the second injection fuel Q2 is injected at the timing when the nozzle port center line 18*b* intersects the bulging portion 141*c*, it reaches the cavity 140. The second injection fuel Q2 combusts together with the main injection fuel Q1' near the CTDC. The second injection fuel Q2 also contributes to the generation of the torque of the engine 1. Therefore, in the fuel injection mode of this embodiment, the thermal efficiency of the engine 1 improves, which is advantageous for improving the fuel efficiency.

By performing the second injection subsequent to the main injection, the oxidation of soot generated as the fuel of the main injection combusts is stimulated, and therefore, soot emission is reduced.

Figure 8:
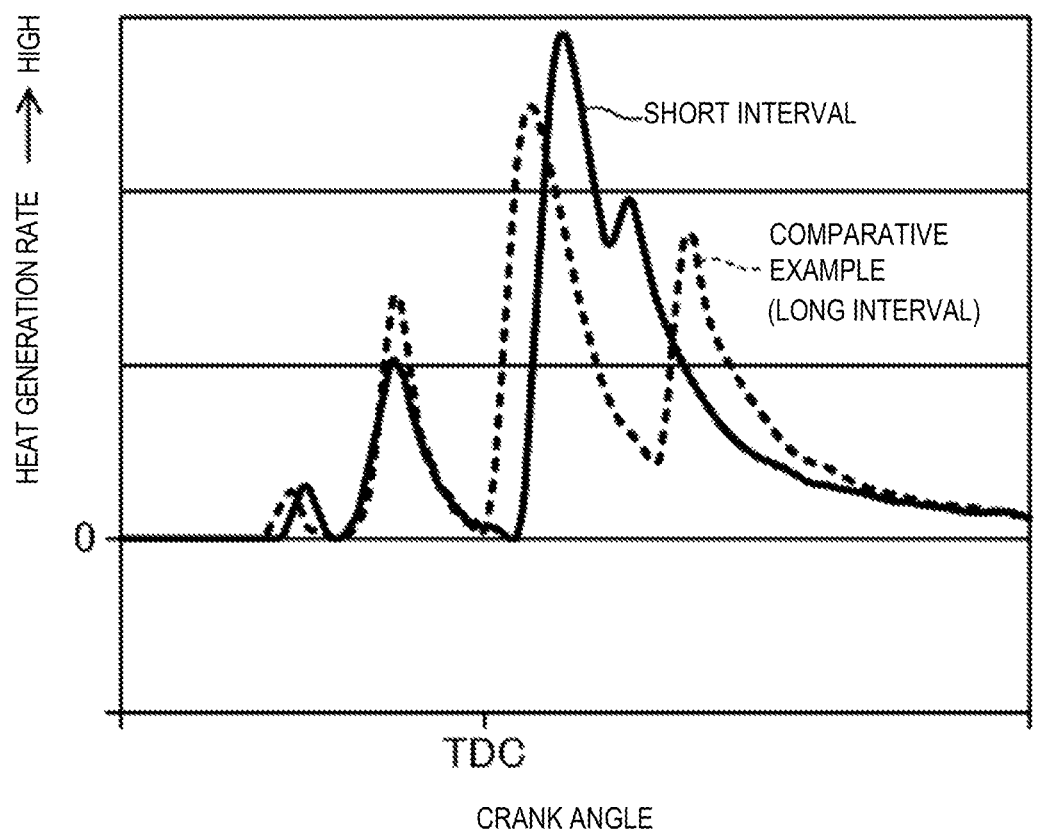
FIG. 8 is a chart illustrating a comparison between combustion waveforms of the fuel injection mode of FIG. 6 and the fuel injection mode of FIG. 7.

Here, FIG. 8 is a chart illustrating a comparison between a combustion waveform (solid line) in the fuel injection mode of FIG. 6 and a combustion waveform (dashed line) in the fuel injection mode of FIG. 7. In FIG. 8, the horizontal axis indicates the crank angle, and the vertical axis indicates a heat generation rate in the combustion chamber 14*a*.

In the combustion waveform of the injection mode of this embodiment, a hill of the combustion caused by the main injection fuel appears near the CTDC and a hill of the combustion caused by the second injection fuel appears near the hill of the combustion caused by the main injection fuel. It can be understood that the peak of the heat generation rate is high, the combustion period is shortened, and the thermal efficiency is high.

In this regard, in the combustion waveform of the injection mode of the comparative example, a hill of the combustion caused by the second injection fuel appears far from a hill of the combustion caused by the main injection fuel, appearing near the CTDC. It can be understood that the peak of the heat generation rate is low, the combustion period on the expansion stroke is extended, and the thermal efficiency is relatively low.

Therefore, by shortening the interval between the main injection and the second injection as in the injection mode of this embodiment, both the reduction of soot emission and improvement of fuel efficiency are achieved. Hereinafter, the injection mode of this embodiment in which the interval is shortened is referred to as "short interval injection." The short interval injection may be defined as performing the second injection at a timing when the nozzle port center line 18*b* of the injector 18 intersects the bulging portion 141*c* after the main injection is ended, or performing the second injection into the cavity 140 at a timing after the main injection is ended and when the main injection fuel turns back.

The injection mode in which the interval between the main injection and the second injection is extended longer than the short interval injection is referred to as "long interval injection." The long interval injection has a longer interval between the main injection and the second injection than the short interval injection. The long interval injection may be defined as performing the second injection at the timing when at least a portion of the fuel reaches the outside of the cavity 140 after the main injection is ended. The comparative example illustrated in FIG. 7 is one example of the long interval injection.

Figure 9:
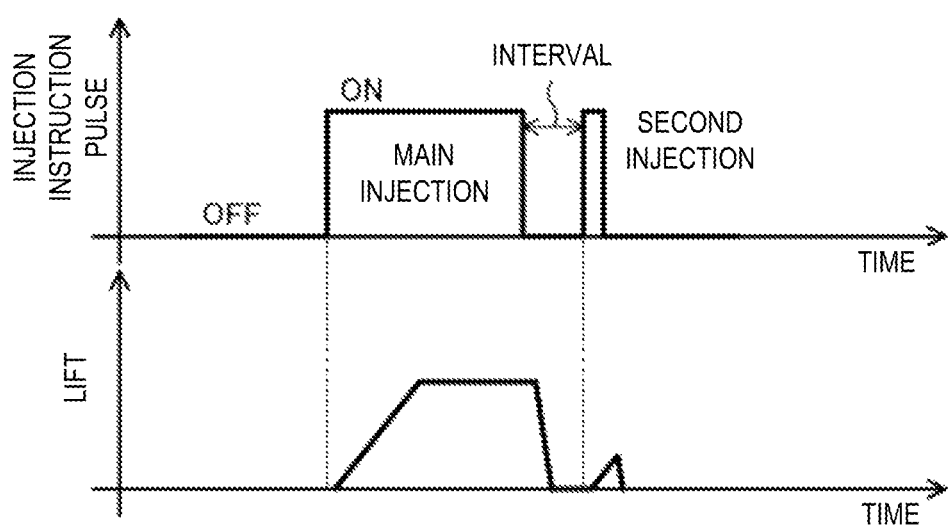
FIG. 9 shows charts illustrating a correspondence between an injection instruction pulse outputted from the PCM and a change in a lift of a fuel injector.

Here, the interval between the main injection and the second injection is described. The upper chart of FIG. 9 illustrates a time chart of the injection instruction pulse which the PCM 10 outputs to the injector 18. In the main injection, since the fuel injection amount is relatively large, the injection instruction pulse is long. When the injection instruction pulse is turned ON, as illustrated in the lower chart of FIG. 9, a needle of the injector 18 begins to lift after a given time of delay from the turning ON of the injection instruction pulse. The lift of the needle gradually increases to reach a highest lift after a given period of time.

Then, when the injection instruction pulse is turned OFF, the lift of the needle reduces to reach zero after a given time of delay from the timing when the injection instruction pulse is turned OFF.

In the second injection, since the fuel injection amount is relatively small, the injection instruction pulse is short. When the injection instruction pulse is turned ON, similar to the above description, the needle begins to lift, whereas in the second injection, the injection instruction pulse turns OFF while the needle lift is gradually increasing, the needle lift becomes zero without reaching the highest lift.

As illustrated in the upper chart of FIG. 9, the interval between the main injection and the second injection may be defined as a time length from the timing when the injection instruction pulse of the main injection outputted from the PCM 10 is turned OFF to the timing when the injection instruction pulse of the second injection is turned ON. As illustrated in the lower chart of FIG. 9, the interval between the main injection and the second injection is substantially the same as a time length for the needle of the injector to begin to lift in the second injection since the lift becomes zero in the main injection.

(Switch Between Short Interval Injection and Long Interval Injection)

Figure 10:
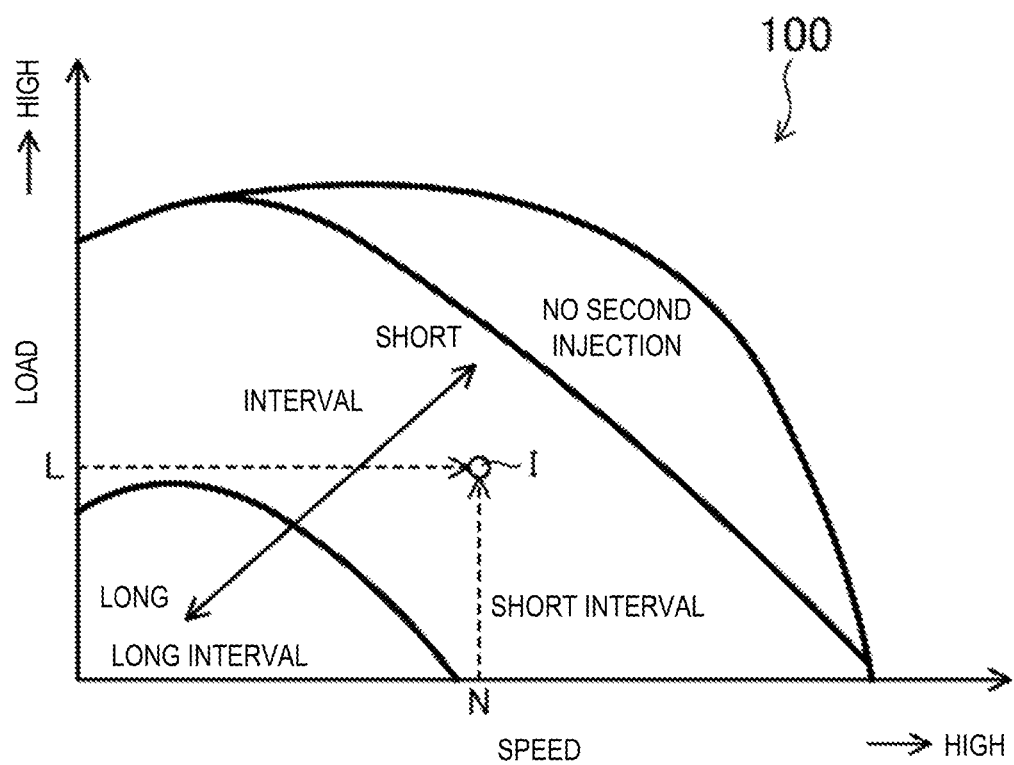
FIG. 10 is a chart illustrating a map relating to interval setting.

FIG. 10 illustrates a map 100 for determining the interval between the main injection and the second injection. The map 100 is stored in the memory of the PCM 10. This map 100 sets each interval I corresponding to each engine load L and each engine speed N. At S52 in the flowchart of FIG. 5, the PCM 10 determines the interval by referring to the map 100 based on the engine load and the engine speed.

An operating range of the engine 1 is divided into three ranges in terms of the interval. The three ranges include the short interval range, the long interval range, and the range in which the second injection is not performed. The long interval range is a range where the engine load or speed is lower than in the short interval range. The long interval range corresponds to a low-load low-speed range of the engine 1. The range in which the second injection is not performed is a range where the engine load or speed is higher than in the short interval range. The range in which the second injection is not performed corresponds to a high-load high-speed range of the engine 1. The range in which the second injection is not performed includes a part of a full open load.

Within the short interval range, the short interval injection is applied for the main injection and the second injection. The interval between the main injection and the second injection is shortened to achieve both the reduction of soot emission and improvement of fuel efficiency as described above. The short interval range may be referred to as "first range."

Within the long interval range, the long interval injection is applied for the main injection and the second injection. By extending the interval between the main injection and the second injection, soot emission is reduced within the low-load low-speed range of the engine 1 as described below. The long interval range may be referred to as "second range."

Figure 11:
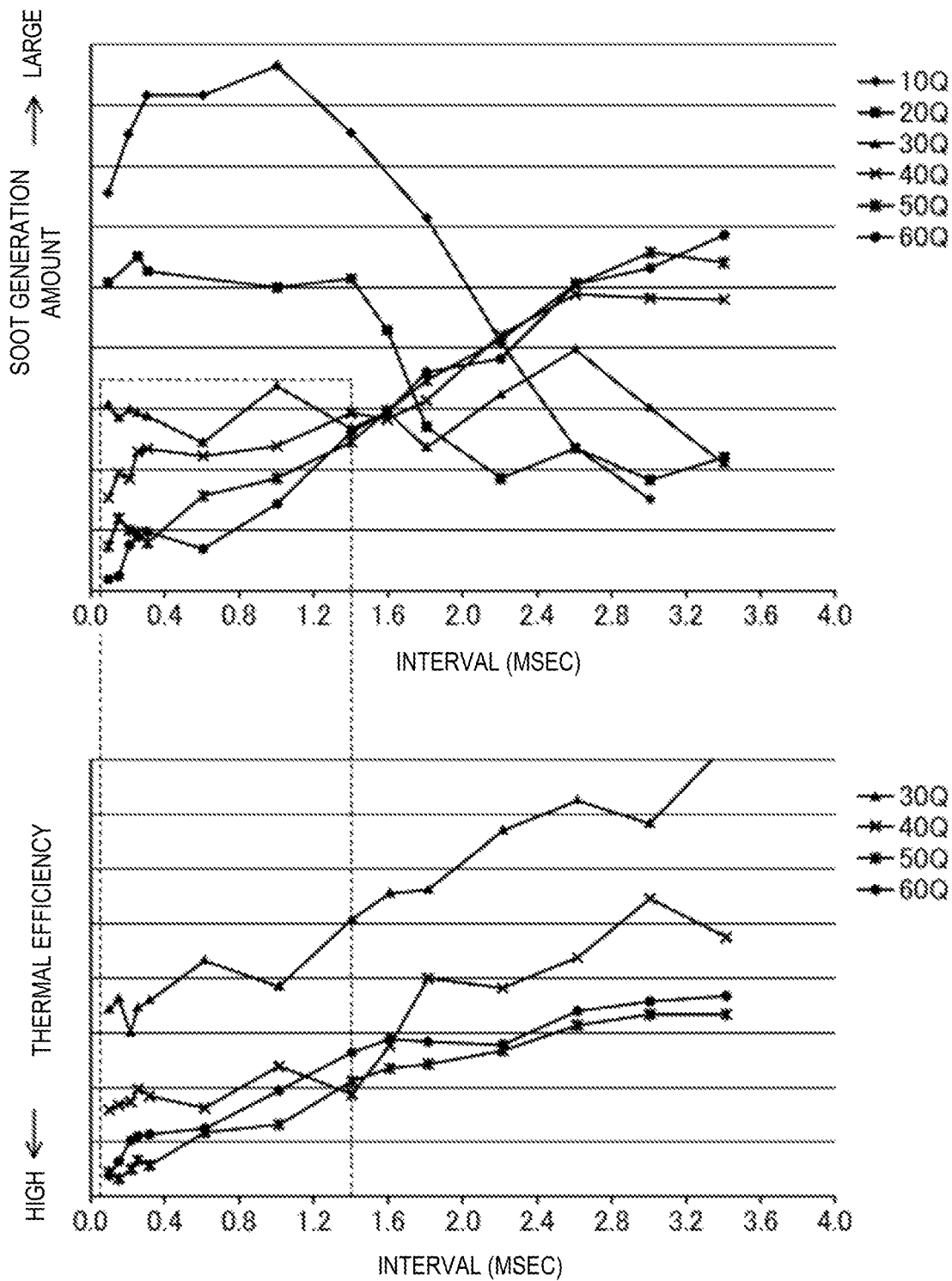
FIG. 11 shows charts in which the upper chart illustrates a relationship between an interval and a soot generation amount when an injection amount is changed, and the lower chart illustrates a relationship between the interval and thermal efficiency when the injection amount is changed.

The upper chart of FIG. 11 illustrates a relationship between the length of the interval between the main injection and the second injection and the generation amount of soot, and the lower chart of FIG. 11 illustrates a relationship between the length of the interval and the thermal efficiency. The engine speed is low (1,500 rpm), and 10 Q, 20 Q, 30 Q, 40 Q, 50 Q, and 60 Q are fuel injection amounts. That is, 10 Q and 20 Q correspond to low loads, 30 Q and 40 Q correspond to medium loads, and 50 Q and 60 Q correspond to high loads.

As illustrated in the upper chart of FIG. 11, while the engine 1 is operating at a medium or high load, the generation amount of soot decreases when the interval between the main injection and the second injection becomes short, and the generation amount of soot increases when the interval between the main injection and the second injection becomes long. As described above, when the interval between the main injection and the second injection becomes long, the main injection fuel has returned close to the injector 18 at the injection timing of the second injection, and the main injection fuel and the second injection fuel mix with each other and, thus, the generation amount of soot is estimated to increase. Therefore, when the engine 1 is operating at the medium or high load, the interval between the main injection and the second injection is preferably shortened. When the interval between the main injection and the second injection is shortened, the thermal efficiency of the engine 1 also improves as illustrated in the lower chart of FIG. 11. In the example of FIG. 11, both the reduction of soot emission and improvement of fuel efficiency are achieved within a range defined by the dashed line. The short interval injection is preferably set to have the interval of 1.4 msec or less. Note that while a lowest value of the interval is determined based on the specifications of the injector 18, it may be, for example, 0.1 msec.

On the other hand, as illustrated in the upper chart of FIG. 11, while the engine 1 is operating at a low load, the generation amount of soot increases when the interval between the main injection and the second injection becomes short, and the generation amount of soot decreases when the interval between the main injection and the second injection becomes long. The tendency of the generation of soot is opposite between the low engine load operation and the medium/high engine load operation.

Figure 12:
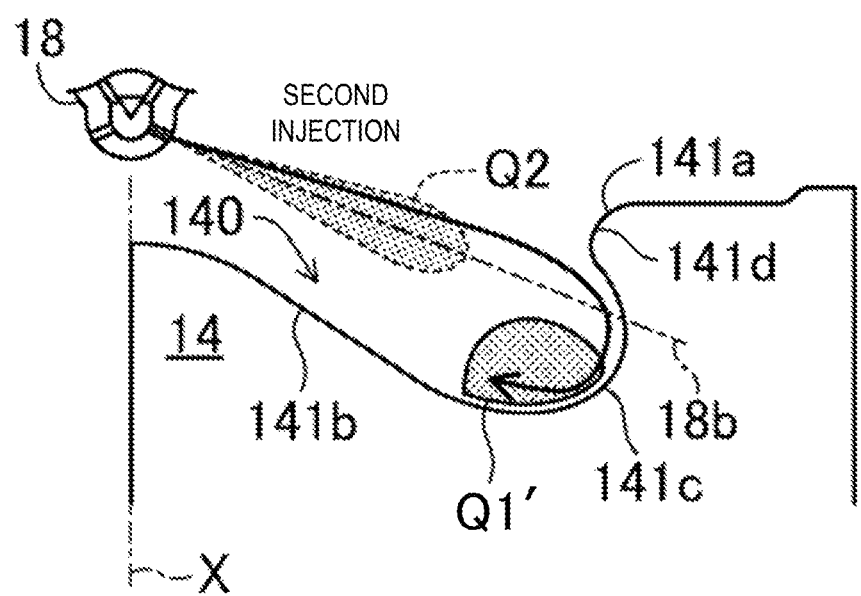
FIG. 12 is a view illustrating a state inside the combustion chamber in a second injection when an engine load or speed is low.

The reason for this is considered to be because the injection amount of the main injection is small when the engine 1 is operating at a low load and a low speed. As schematically illustrated in FIG. 12, since the penetration becomes weak when the injection amount of the main injection is small, the fuel Q1' remains near the bulging portion 141c of the cavity 140 after colliding with the bulging portion 141c. If the interval between the main injection and the second injection is shortened to allow the second injection fuel Q2 to reach inside the cavity 140 in the state illustrated in FIG. 12, the main injection fuel Q1' and the second injection fuel Q2 mix with each other, and the concentration of the fuel locally increases. As a result, it is considered that shortening the interval between the main injection and the second injection increases the generation amount of soot.

Therefore, within the low-load low-speed range in which the fuel amount of the main injection is small, i.e., within the long interval range, the interval between the main injection and the second injection is set to be long so as to prioritize the reduction of the generation of soot. In other words, by setting the long interval between the main injection and the second injection, the main injection fuel moves away from the bulging portion 141c accordingly, and thus, the mixing between the main injection fuel and the second injection fuel is avoided. As a result, the soot generation is reduced. On the other hand, at the second injection timing, since the piston 14 is descending, at least a portion of the second injection fuel reaches outside of the cavity 140. Therefore, the contribution of the second injection fuel on the engine torque generation lowers. In the example of FIG. 11, the long interval injection preferably has an interval longer than 1.4 msec.

Returning to the map 100 of FIG. 10, within the range in which the second injection is not performed, the interval between the main injection and the second injection is zero. Within a high-load high-speed range of the engine 1, the injection amount of the main injection is large. Therefore, the injection instruction pulse becomes long and it becomes difficult to divide the fuel injection into the main injection and the second injection. Further, since the injection amount of the main injection is large, when the main injection and the second injection are performed, the concentration of the fuel in the combustion chamber locally becomes high, causing the soot generation. Therefore, within the high-load high-speed range of the engine 1, the second injection is not performed.

Note that within each of the short interval range, the long interval range, and the range in which the second injection is not performed, an injection other than the main injection and the second injection (e.g., a pre-stage injection before the main injection) may be performed in one combustion cycle.

Here, regarding the map 100 of FIG. 10, within the short interval range, the interval is not always constant but is changed according to the operating state of the engine 1. For example, the PCM 10 shortens the interval as the engine speed increases. As described above, the engine 1 includes the large turbocharger 61 and the small turbocharger 62, and the turbochargers turbocharge at higher pressure as the engine speed increases. Therefore, the pressure inside the cylinder 11a increases as the engine speed increases. When the pressure inside the cylinder 11a increases, it becomes hard for the fuel spray injected from the injector 18 to travel. Especially since the second injection performed after the main injection has a smaller fuel injection amount than the main injection, the penetration by the second injection is weak. Thus, due to becoming harder for the second injection fuel to travel as the engine speed increases, after the second injection, the piston 14 descends while the fuel is spreading, and the fuel does not reach inside the cavity 140.

Therefore, within the short interval range, the second injection is performed at a shorter interval as the engine speed increases, i.e., the pressure inside the cylinder 11a increases. In this manner, the second injection is performed when the piston 14 is near the CTDC, and therefore, even when the pressure inside the cylinder 11a is high, the second injection fuel successfully reaches the cavity 140. This is advantageous for generating the engine torque, and both the reduction of soot emission and improvement of fuel efficiency are achieved.

The same relationship between the engine speed and the interval is also established within the long interval range. That is, also within the long interval range, the PCM 10 shortens the interval as the engine speed is higher (i.e., as the pressure inside the cylinder 11a is higher), which becomes advantageous for generating the engine torque, and both the reduction of soot emission and improvement of fuel efficiency are achieved.

In addition, within the short interval range, the PCM 10 performs the second injection at a shorter interval as the injection amount of the main injection increases. When the injection amount of the main injection is large, due to the high penetration, the required time for the main injection fuel to return, after colliding with the bulging portion 141c, back toward the injector 18 from the cavity 140 and reach close to the injector 18, becomes short. When the second injection is performed after the main injection fuel reaches close to the injector 18, as described above, the main injection fuel and the second injection fuel mix with each other and the concentration of the fuel becomes locally high.

Therefore, the second injection is performed at a shorter interval as the injection amount of the main injection increases. Since the fuel of the main injection has not reached close to the injector 18 at the timing of performing the second injection, mixing of the main injection fuel and the second injection fuel with each other is avoided. Further, by shortening the interval, since the piston 14 is located near the CTDC when the second injection is performed, the second injection fuel reaches the cavity 140. The second injection fuel contributes to the generation of engine torque, which is advantageous for improving fuel efficiency.

The same relationship between the injection amount of the main injection and the interval is also established within the long interval range. That is, within the long interval range, the PCM 10 shortens the interval as the injection amount of the main injection increases, which becomes advantageous for reducing soot emission, and both reduction of soot emission and improvement of fuel efficiency are achieved.

Therefore, in the map 100 of FIG. 10, within the short interval range and the long interval range, the interval is generally set shorter toward the upper right, and longer toward the lower left.

Figure 13:
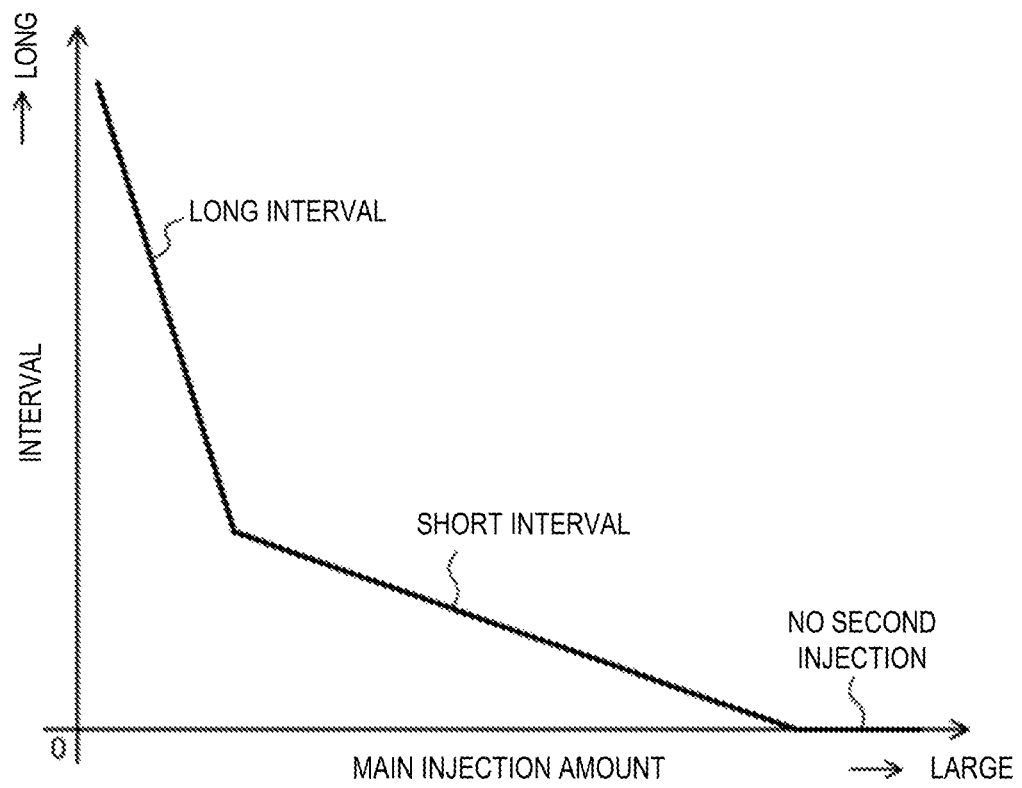
FIG. 13 is a chart illustrating a relationship between an injection amount of a main injection and the interval.

FIG. 13 is a chart illustrating a relationship between the injection amount of the main injection (main injection amount) and the interval. The main injection amount is substantially proportional to the magnitude of the engine torque. Therefore, the horizontal axis of FIG. 13 may be replaced with the engine load.

As described above, when the main injection amount is small, the PCM 10 performs the long interval injection in order to reduce the soot generation caused by the mixing of the main injection fuel and the second injection fuel. The interval between the main injection and the second injection is relatively long. In the long interval injection, the penetration of the main injection becomes stronger as the main injection amount increases, and the mixing of the main injection fuel and the second injection fuel is easily avoided; therefore, the interval is shortened. Shortening the interval is advantageous for improving the fuel efficiency.

When the main injection amount further increases, the PCM 10 switches the long interval injection to the short interval injection. The interval between the main injection and the second injection becomes relatively short. Even in the short interval injection, the interval is shortened as the main injection amount increases. Thus, the mixing of the main injection fuel and the second injection fuel is avoided and the soot generation is reduced, and it is also advantageous for improving the fuel efficiency. In FIG. 13, the slope of the straight line for the long interval injection is different from the slope of the straight line for the short interval injection. The slope of the straight line for the short interval injection is relatively gentler.

When the main injection amount further increases, the PCM 10 does not perform the second injection. Thus, the interval becomes zero. By not performing the second injection, the generation of soot is reduced.

(Control in Transient Operation)

The map 100 in FIG. 10 is for a steady operation of the engine 1, and during the transient operation, such as during acceleration, the PCM 10 may correct the interval so as to correspond to a response delay of the turbocharger. That is, when the turbocharging pressure is not increased to the target turbocharging pressure due to the response delay, the pressure inside the cylinder 11a becomes lower than the estimated pressure in the map 100 of FIG. 10. When the pressure inside the cylinder 11a is low, it becomes easy for the fuel injected by the injector 18 to travel. Therefore, since the timing at which the main injection fuel returns back becomes relatively early, even if the interval is set shorter than the value of the map 100 set in FIG. 10, the main injection fuel and the second injection fuel do not mix with each other. That is, the soot generation is reduced. On the other hand, since shortening the interval brings the timing of the second injection earlier, the second injection fuel greatly contributes in generating the engine torque. That is, shortening the interval during acceleration, the thermal efficiency of the engine 1 is improved while reducing soot emission, which is advantageous for increasing torque and improving fuel efficiency.

(Other Embodiments)

Note that although in the configuration described above the engine 1 includes both the large turbocharger 61 and the small turbocharger 62, the engine 1 may include a so-called single turbocharger having one compressor and one turbine.

Further, the engine 1 may include a supercharger or an electric booster alternatively to the turbocharger.

Further, in the above configuration, the interval between the main injection and the second injection is set by using the map 100 illustrated in FIG. 10. However, the interval between the main injection and the second injection may be set by using, instead of the map control, a model based on the turbocharging pressure detected by the turbocharging pressure sensor SW2 as a parameter relating to the intake air pressure of the engine 1.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

1 Engine
14 Piston
140 Cavity
140b Raised Center Portion
140c Bulging Portion
141d Lip Portion 18 Injector (Fuel Injector)
18a Nozzle Port
61 Large Turbocharger
62 Small Turbocharger
X Cylinder Center Axis

The invention claimed is:

1. A control system of an engine, comprising:
a piston configured to reciprocate in a cylinder along a center axis of the cylinder and formed with a cavity with a center at the center axis on a crown surface of the piston;
a fuel injector disposed facing a top surface of the piston and configured to inject fuel along an injection axis; and
a processor operatively coupled to the fuel injector, wherein
an inner surface of the cavity includes, in a cross-section including the center axis of the cylinder:
a raised center portion bulging toward the fuel injector as well as bulging larger toward the center of the cavity, the raised center portion formed with a first sloping portion extending outward from the center axis;
a bulging portion formed with a second sloping portion extending inward toward the raised center portion so as to slope toward the center axis in a radial direction of the piston, and formed with an arc formed continuously from the second sloping portion to concave radially inward toward the center axis when viewed in the cross-section including the center axis of the cylinder; and
a lip portion formed between the bulging portion and an opening edge of the cavity and formed to convex radially inward when viewed in the cross-section including the center axis of the cylinder,
the first sloping portion of the raised center portion and the second sloping portion of the bulging portion are integrally formed as only continuously curving and linear portions,
when the piston is located near a top dead center of compression stroke, the processor is configured to cause the fuel injector to perform a first injection so that the fuel flows from the fuel injector toward an upper portion of the bulging portion along the injection axis; collides with the inner surface of the cavity; then flows back toward the fuel injector along the inner surface of the cavity, from a position offset from the injection axis, and
the processor is configured to cause the fuel injector to perform a second injection toward the cavity at an injection start timing during an expansion stroke after the first injection, and at which the fuel of the first injection flows back.

2. The control system of claim 1, wherein the fuel injected in the first injection flows along the raised center portion from the bulging portion of the cavity to turn back toward the fuel injector from the position offset from the injection axis, the position being offset from the injection axis in a descending direction of the piston.

3. A control system of an engine, comprising:
a piston configured to reciprocate in a cylinder along a center axis of the cylinder and formed with a cavity with a center at the center axis on a crown surface of the piston;
a fuel injector disposed facing a top surface of the piston and configured to inject fuel from a nozzle port; and
a processor operatively coupled to the fuel injector, wherein an inner surface of the cavity includes, in a cross-section including the center axis of the cylinder:
a raised center portion bulging toward the fuel injector as well as bulging larger toward the center of the cavity, the raised center portion formed with a first sloping portion extending outward from the center axis;
a bulging portion formed with a second sloping portion extending inward toward the raised center portion so as to slope toward the center axis in a radial direction of the piston, and formed with an arc formed continuously from the second sloping portion to concave radially inward toward the center axis when viewed in the cross-section including the center axis of the cylinder; and
a lip portion formed between the bulging portion and an opening edge of the cavity and formed to convex radially inward when viewed in the cross-section including the center axis of the cylinder,
the first sloping portion of the raised center portion and the second sloping portion of the bulging portion are integrally formed as only continuously curving and linear portions,
a nozzle port center line that is an extension of a center of the nozzle port of the fuel injector intersects the bulging portion when the piston is located at one of a top dead center of compression stroke and a given position near the top dead center of the compression stroke, and
the processor is configured to cause the fuel injector to perform a main injection toward the bulging portion of the cavity at a first injection start timing when the piston is located near the top dead center of the compression stroke, and further cause the fuel injector to perform a second injection at a second injection start timing when the nozzle port center line intersects the bulging portion during an expansion stroke after a given interval from the end of the main injection.

4. The control system of claim 3, further comprising a turbocharger configured to increase intake air pressure of the engine as an engine speed increases,
wherein the processor is configured to cause the fuel injector to perform the second injection at a shorter interval as the engine speed increases.

5. The control system of claim 3, further comprising a sensor configured to detect a parameter relating to an intake air pressure of the engine,
wherein the processor is configured to cause the fuel injector to perform the second injection at a shorter interval as the intake air pressure increases.

6. The control system of claim 3, wherein the processor is configured to cause the fuel injector to perform the second injection at a shorter interval as a fuel injection amount of the main injection increases.

7. The control system of claim 3, wherein, when the engine is operating within a first range, the processor is configured to cause the fuel injector to perform the second injection at the second injection start timing, and when the engine is operating within a second range in which one of an engine load and an engine speed is lower than in the first range, the processor is configured to cause the fuel injector to extend the interval and perform the second injection at a third injection start timing at which at least a portion of the fuel reaches outside of the cavity.

8. A method of controlling an engine, the engine comprising:

a piston formed with a cavity with a center at a center axis of a cylinder on a crown surface of the piston and configured to reciprocate in the cylinder along the center axis of the cylinder, an inner surface of the cavity including, in a cross section including the center axis of the cylinder:

- a raised center portion bulging toward a fuel injector as well as bulging larger toward the center of the cavity, the raised center portion formed with a first sloping portion extending outward from the center axis;
- a bulging portion formed with a second sloping portion extending inward toward the raised center portion so as to slope toward the center axis in a radial direction of the piston, and formed with an arc formed continuously from the second sloping portion to concave radially inward toward the center axis when viewed in the cross-section including the center axis of the cylinder; and
- a lip portion formed between the bulging portion and an opening edge of the cavity and formed to convex radially inward when viewed in the cross-section including the center axis of the cylinder, the fuel injector disposed facing a top surface of the piston and configured to inject fuel from a nozzle port, a nozzle port center line that is an extension of a center of the nozzle port of the fuel injector intersecting the bulging portion when the piston is located at one of a top dead center of compression stroke and a given position near the top dead center of the compression stroke;

the first sloping portion of the raised center portion and the second sloping portion of the bulging portion integrally formed as only continuously curving and linear portions; and a processor operatively coupled to the fuel injector, the method comprising:

via the processor, causing the fuel injector to perform a main injection toward the bulging portion of the cavity at a first injection start timing when the piston is located near the top dead center of the compression stroke, and via the processor, causing the fuel injector to perform a second injection at a second injection start timing when the nozzle port center line intersects the bulging portion during an expansion stroke after a given interval from the end of the main injection.

* * * * *